(12) United States Patent
Ananthapur Bache et al.

(10) Patent No.: US 12,026,148 B2
(45) Date of Patent: Jul. 2, 2024

(54) DYNAMIC UPDATING OF DIGITAL DATA

(71) Applicant: International Business Machines Corporation, Armonk, NY (US)

(72) Inventors: Vijay Kumar Ananthapur Bache, Bangalore (IN); Arvind Rangarajan, Chennai (IN); Pradeep Raj Jayarathanasamy, Chennai (IN); Srithar Rajan Thangaraj, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 17/210,835

(22) Filed: Mar. 24, 2021

(65) Prior Publication Data

US 2022/0309054 A1    Sep. 29, 2022

(51) Int. Cl.
*G06F 16/23*       (2019.01)
*G06N 20/00*       (2019.01)

(52) U.S. Cl.
CPC ......... *G06F 16/2379* (2019.01); *G06N 20/00* (2019.01)

(58) Field of Classification Search
CPC .......................... G06F 16/2379; G06N 20/00
USPC ....................................................... 707/703
See application file for complete search history.

(56) References Cited

U.S. PATENT DOCUMENTS

| | | | |
|---|---|---|---|
| 7,113,962 B1 | 9/2006 | Kee | |
| 8,620,994 B2 | 12/2013 | Boyd | |
| 11,373,262 B2 * | 6/2022 | Falde | B23K 9/095 |
| 2005/0119913 A1 | 6/2005 | Hornreich | |
| 2015/0055709 A1 * | 2/2015 | Kim | H04N 19/51 |
| | | | 375/240.16 |
| 2015/0324527 A1 * | 11/2015 | Siegel | G16B 50/30 |
| | | | 705/3 |
| 2017/0169180 A1 * | 6/2017 | Hamann | G16H 50/50 |
| 2019/0205050 A1 | 7/2019 | Koorapati | |
| 2019/0320113 A1 * | 10/2019 | Rajvanshi | H04N 23/64 |
| 2020/0082018 A1 * | 3/2020 | Goenka | G06F 40/205 |
| 2020/0089681 A1 * | 3/2020 | Rogynskyy | G06F 16/178 |
| 2020/0202256 A1 * | 6/2020 | Chaudhari | G06N 20/20 |
| 2020/0288204 A1 | 9/2020 | Duersch | |
| 2020/0302116 A1 | 9/2020 | Rogynskyy | |

(Continued)

*Primary Examiner* — Amy Ng
*Assistant Examiner* — Abdullah A Daud
(74) *Attorney, Agent, or Firm* — Joseph P. Curcuru

(57) ABSTRACT

Embodiments of the present invention provide a computer system a computer program product, and a method that comprises converting the retrieved data to a uniform syntax for data assessment; performing a query on a plurality of external data sources for additional information associated with the converted data; analyzing a plurality of indicative markers associated with the retrieved data and the additional information; generating a plurality of machine learning models associated with the converted data based on the analysis of each indicative markers within the plurality of indicative markers; dynamically selecting at least one generated machine learning model within the plurality of generated machine learning models associated with the retrieved data based on an analysis of the plurality of indicative markers associated with the retrieved data and the additional information; and automatically verifying an accuracy value associated with the at least one selected generated machine learning model.

20 Claims, 4 Drawing Sheets

(56) References Cited

U.S. PATENT DOCUMENTS

| | | | |
|---|---|---|---|
| 2020/0302933 A1* | 9/2020 | Arciero | G06F 40/289 |
| 2021/0158213 A1* | 5/2021 | Shirakawa | G06F 18/214 |
| 2021/0158218 A1* | 5/2021 | Machida | G06N 20/00 |
| 2021/0209877 A1* | 7/2021 | Neill | G06V 40/172 |
| 2021/0271897 A1* | 9/2021 | Hara | G06N 20/00 |
| 2021/0279648 A1* | 9/2021 | Sivanandam | G06F 16/951 |
| 2021/0383308 A1* | 12/2021 | Hanna | G06Q 10/06398 |
| 2022/0101186 A1* | 3/2022 | Sharma Mittal | G06V 10/751 |
| 2022/0138785 A1* | 5/2022 | Zarakas | G06F 18/214 |
| | | | 705/7.35 |
| 2022/0172844 A1* | 6/2022 | Uehara | G16H 40/67 |
| 2022/0345543 A1* | 10/2022 | Oleinikov | G06F 16/28 |

\* cited by examiner

DYNAMIC UPDATING OF DIGITAL DATA

BACKGROUND

The present invention relates generally to the field of data mining, and more specifically data selection using a machine learning data pipeline.

Digital content is defined as any content that exists in the form of digital data. Also known as digital media, digital content stored on digital or analog storage in specific formats. Forms of digital content include information that is digitally broadcast, streamed, or contained in computer files. Viewed narrowly, digital content includes popular media types, while a broader approach considers any type of digital information (e.g., digitally updated weather forecasts, GPS maps, and so on) as digital content. Digital content has increased as more households have accessed the internet. Expanded access has made it easier for people to receive their news and watch television online, challenging the popularity of traditional platforms. Increased access to the internet has also led to the mass publication of digital content through individuals in the forms of eBooks, blog posts, and other social media posts.

In computing, a pipeline, also known as a data pipeline, is a set of data processing elements connected in series, where the output of one element is the input of the next element. The elements of a pipeline are often executed in parallel or in time-sliced fashion. Some amount of buffer storage is often inserted between elements. Software pipelines, which consist of a sequence of computing processes (commands, program runs, tasks, threads, procedures, etc.) conceptually executed in parallel, with the output stream of one process being automatically fed as the input stream of the next one.

SUMMARY

Embodiments of the present invention provide a computer system a computer program product, and a method that comprises converting the retrieved data to a uniform syntax for data assessment; performing a query on a plurality of external data sources for additional information associated with the converted data; analyzing a plurality of indicative markers associated with the retrieved data and the additional information; generating a plurality of machine learning models associated with the converted data based on the analysis of each indicative markers within the plurality of indicative markers; dynamically selecting at least one generated machine learning model within the plurality of generated machine learning models associated with the retrieved data based on an analysis of the plurality of indicative markers associated with the retrieved data and the additional information; and automatically verifying an accuracy value associated with the selected generated machine learning model data.

DETAILED DESCRIPTION

Embodiments of the present invention recognize the need for an improvement in data retrieval technologies that dynamically verify the correctness of digital data prior to presenting the retrieved data without requiring manual verification of the digital data. Generally, data retrieval technologies present incorrect digital data due to the amount of outdated data stored within external databases that is not updated at regular time intervals with current data and information. Current data retrieval technologies lack dynamic verification of data, which is defined as real-time verification of data without the use of human interference, increasing inaccuracy of the current data retrieval technologies. Furthermore, the current data retrieval technologies are becoming obsolete by failing to present digital data that is verified as current or provide an accuracy rating that reflects the correctness associated with the retrieved digital data. Embodiments of the present invention improve the current data retrieval technologies by implementing an automated program that dynamically selects digital data from an external source and automatically verifies the accuracy of the selected digital data. Embodiments of the present invention dynamically select digital data by determining a range of accuracy associated with the digital data, assigning an accuracy value associated with each set of digital data within a plurality of digital data sets, and ranking the plurality of digital data sets based on the assigned accuracy values. Embodiments of the present invention automatically verify the selected digital data by determining when a digital data set with an assigned value was last updated, comparing the selected digital data to previous digital data similar to that digital data, and presenting the latest version of the selected digital data. In this embodiment, the automated program improves the current data retrieval technologies by validating digital contents using machine learning algorithms and providing the accuracy of the selected digital data with a predetermined threshold level, where this predetermined threshold level is inversely proportionate with a level of risk associated with the selected digital data. In other embodiments, the program improves the current data retrieval technologies by dynamically recommending changes accompanied with references for selected digital data that fails to reach a predetermined threshold. In this embodiment, the program continuously learns from the selected digital data by periodically accessing the accuracy value associated with the selected digital data, generating a notification alerting a user of the accuracy value associated with the selected digital data and considering acceptance/rejection of the accuracy/recommendation.

Figure 1:
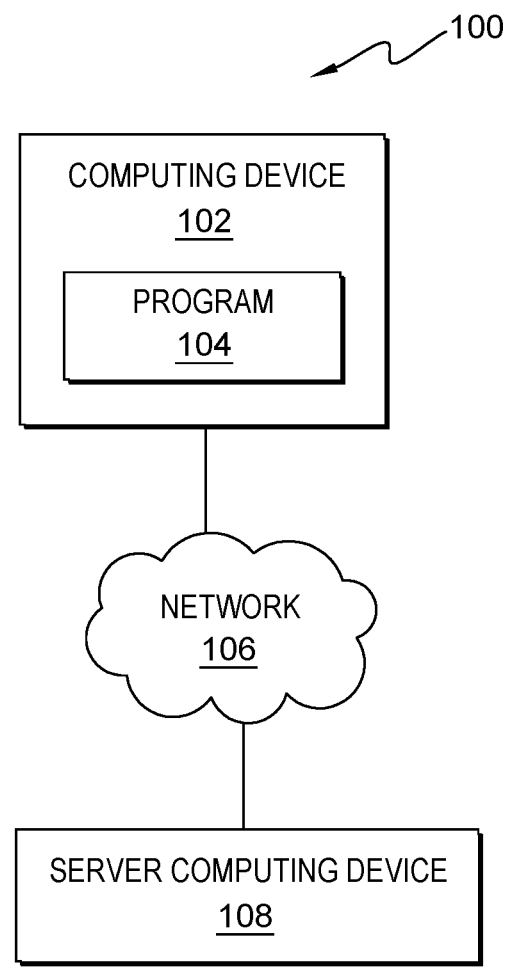
FIG. 1 is a functional block diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, wearable technology, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 4.

The computing device 102 may include a program 104. The program 104 may be a stand-alone program 104 on the computing device. In another embodiment, the program 104 may be stored on a server computing device 108. In this embodiment, the program 104 improves current data retrieval technology by dynamically selecting digital data from an external source based on an identified query and automatically validating the selected digital data based on a calculated accuracy value associated with the selected digital data. In another embodiment, the program 104 continuously learns from the selected digital data by periodically assessing the correctness of selected digital data and generating a notification associated with the selected digital data in response to selecting digital data with an accuracy value that does not meet the predetermined threshold of accuracy. In this embodiment, the program 104 defines correctness as a quantitative value associated with the accuracy of the digital data to provide accurate and up to date information. In this embodiment, the program 104 dynamically selects the digital data from a server computing device 108 and automatically validates the selected digital data by periodically retrieving data from an external digital source; converting the retrieved data into a uniform format that allows for assessment; performing a query of a plurality of different external digital data sources for additional data associated with the retrieved data; analyzing the retrieved data and the additional data for a plurality of indicative markers associated with an accuracy value using a machine learning model (e.g., neural network); dynamically selecting at least one data set within the retrieved data based on the analysis of the plurality of indicative markers associated with the retrieved data; automatically validating an accuracy value associated the selected data based on a calculation of correctness associated with the selected data; and generating a notification detailing the accuracy value associated with the selected data in response to the accuracy value meeting a predetermined threshold of accuracy. In another embodiment, the program 104 trains the machine learning model associated with the analyzed data based on various parameters. In this embodiment, the program 104 defines the various parameters as the domain, topic, author, author's credibility score, author's area of specialization, and past acceptance information for dynamically selecting the at least one data set from external sources.

In this embodiment, the program 104 converts the retrieved data to a uniform format that allows for dynamic assessment by using a data translation algorithm. In this embodiment, the program 104 defines the conversion as a process of transforming data from a form used by the external data source where the program 104 retrieved the digital data into a form required for the plurality of data sets to be aggregated within the computing device 102. In this embodiment, the program 104 performs the query on a plurality of external digital data sources by identifying digital content from internet sources, online book sources, online digital audio sources, online image sources, online video sources, and machine data sources. For example, the program 104 performs a query for cognitive search data on an internet data source, natural language processing data on an online book data source, metadata on an online audio data source, image analysis data on an online image data source, and Internet of Things ("TOT") data on a machine data source. In this embodiment, the program 104 defines the plurality of indicative markers associated with analysis of the retrieved data as information that impacts a determination on the accuracy score associated with the retrieved data. For example, the program 104 identifies the date that the retrieved data was created, and the original source of the data as indicative markers associated with the retrieved data.

In another embodiment, the program 104 generates the notification by generating a recommendation for a user based on the automatic verification of the selected digital data by determining that the accuracy score for the selected digital data meets or exceeds the predetermined threshold of accuracy. In response to the accuracy score meeting or exceeding the predetermined threshold of accuracy, the program 104 generates a plurality of recommendations in the form of ameliorative actions to the dynamically selected data with references from the automatic verification of the external data sources. In this embodiment, the program 104 defines ameliorative actions as any action that corrects an error or aids the user. For example, the program 104 determines that the user is typing a series of characters that does not spell a recognizable work in the English language, then an ameliorative action replaces the string of characters with a word. In yet another example, the program 104 prevents a user from inputting sensitive information into a public domain using an ameliorative action. In another embodiment, the program 104 generates corrections as a list of updated digital media with associated accuracy scores. In another embodiment and in response to generating recommendations of corrections associated with the selected digital data, the program 104 learns from the responses of the user to the generated recommendations by identifying the response of the user to the generated recommendation, periodically assessing the past responses of generated recommendations, storing all responses of generated recommendations in the server computing device 108, and predicting a future user response to a generated recommendation using machine learning algorithms. In another embodiment, the program 104 retrains the data model using the stored responses of generated recommendations.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computing device 108, specifically the program 104 in accordance with a desired embodiment of the invention.

The server computing device 108 communicates with the computing device 102 via the network 106. In this embodiment, the server computing device 108 stores the generated recommendations and user responses associated with the selected digital data of the program 104 (not shown). In another embodiment, the server computing device 108 may include the program 104.

Figure 2:
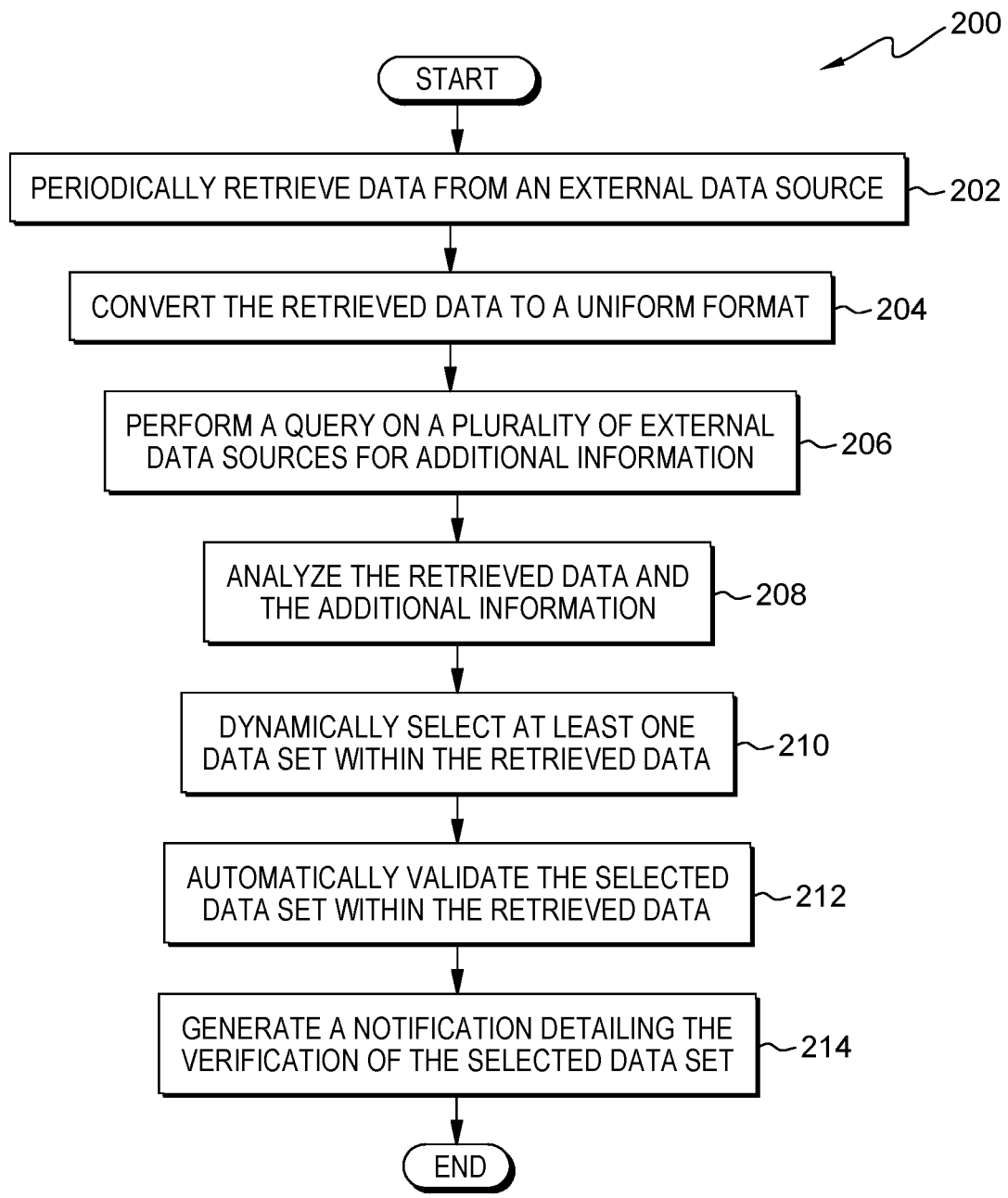
FIG. 2 is a flowchart illustrating operational steps for dynamically selecting external digital data from an external data source, in accordance with at least one embodiment of the present invention.

FIG. 2 is a flowchart 200 illustrating operational steps for dynamically selecting digital data from an external data source, in accordance with at least one embodiment of the present invention.

In step 202, the program 104 periodically retrieves data from an external data source. In this embodiment, the program 104 retrieves digital data from a plurality of external data sources over a plurality of predetermined time intervals by identifying digital data stored on external data sources using a plurality of sensor devices and an artificial intelligence algorithm. In this embodiment, the program 104 identifies a plurality of data sets within the retrieved data. In this embodiment, the program 104 defines periodically as predetermined time intervals repeating over time. In this embodiment, the program 104 defines digital data as content that is stored on an external digital source. For example, the program 104 retrieves data from an internet source and an online video source periodically over a predetermined time period.

In another embodiment, the program 104 initiates in response to receiving a user action. In this embodiment, the 104 defines user action as any step a user may take to retrieve digital content from a digital source. For example, the program 104 retrieves audio data from an internet source in response to a user scrolling through the internet. In this example, the program 104 initiates based on detected content from the internet that has a potential (i.e., a probability) to be incorrect due to lack of an update.

In step 204, the program 104 converts the retrieved data to a uniform format for data assessment. In this embodiment, the program 104 converts the retrieved data into a format that allows for uniform comparison, aggregation, and separation of data sets within the retrieved data by transforming the data to a common dominator using a data translation algorithm. In this embodiment, the program 104 converts the retrieved digital data into a different format that allows for assessment by encoding the retrieved data from one syntax to a different syntax. In this embodiment, the program 104 defines syntax as an arrangement of words, numbers, symbols, or code to create well-formed sentence in a language. For example, the program 104 converts the retrieved image data from an online image data source into a searchable data format from the image data format.

In step 206, the program 104 performs a query on a plurality of external data sources for additional information associated with the retrieved data. In this embodiment and in response to converting the retrieved data into a searchable format, the program 104 performs a query for additional information associated with the retrieved data by retrieving additional data that is associated with the retrieved data. In this embodiment, the program 104 performs the query for additional information by identifying the retrieved data and scanning an external data score for additional information associated with retrieved data. In this embodiment, the program 104 defines additional information as information the details the origin, authenticity, and any updates associated with the retrieved data. For example, the program 104 performs a query on the retrieved data by retrieving the date the retrieved data was created, the publisher of the retrieved data, and the date of the latest update of the retrieved data.

In step 208, the program 104 analyzes the retrieved data and the additional information. In this embodiment, the program 104 analyzes an aggregation of the retrieved data and the additional data for a plurality of indicative markers by determining a positive match percentage based on a calculated comparison between at least one data set within the retrieved data and the additional information retrieved from the plurality of external data sources. In this embodiment, the program 104 calculates the positive match percentage based on the accuracy value by assigning a score of one for each positive match between the indicative markers associated with the retrieved data and the indicative markers associated with the additional information. In this embodiment and in response to summing the assigned scores for each positive match, the program 104 calculates the positive match percentage by dividing the summed assigned score by the total number of indicative markers associated with the retrieved data and additional information. In this embodiment and in response to calculating the positive match percentage, the program 104 determines the accuracy value by placing the calculated positive match percentage on a preset scale the has a range that is directly proportional to the calculated positive match percentage. In this embodiment, the program 104 defines indicative markers as any factor within the retrieved data that has an impact on an accuracy value that is associated with the retrieved data. For example, the program 104 compares the data creation date, the date of the most recent update, the source of the data, the creator of the data of the retrieved data and the additional information retrieved from the server computing device 108.

In another embodiment, the program 104 analyzes the retrieved data and the additional information by determining the positive match percentage between the indicative markers associated with the retrieved data and the indicative markers associated with the additional information, where the positive match percentage is used as expected output of a generated machine learning model. In this embodiment, the program 104 defines the accuracy value as the calculated positive match percentage placed on a scale with a range, with a minimum of one and a maximum of five, that is proportional to a level of confidence regrading correctness of the retrieved data. For example, the program 104 analyzes the digital image data set within the retrieved data and the additional information associated with the digital image data, where the date and origin of the digital image data are indicative markers that are compared for the calculated positive match percentage.

In this embodiment, the program 104 defines the range as the scale of determined risk that the retrieved data is outdated and incorrect. In this embodiment, the higher the accuracy value, the lower the determined risk. In this embodiment, the program 104 determines whether data is outdated by comparing the retrieved data to a predetermined threshold of risk, where outdated data by more than three months meets or exceeds the predetermined threshold of risk. In this embodiment, data that meets or exceed the predetermined threshold of risk based on the date of the last update associated with the data may provide incorrect or outdated information to the user and increases the risk of including incorrect information with the retrieved data. In another embodiment, the program 104 defines the threshold of risk as data that is twenty-four hours old, depending on the type of data.

In step 210, the program 104 dynamically selects the at least one data set within the retrieved data. In this embodiment, the program 104 dynamically selects the at least one data set within the retrieved data based on the analysis of the plurality of indicative markers associated with the retrieved data and the additional information. In another embodiment, the program 104 dynamically selects a generated data model by determining a generated data model with the highest number of positive matches between the indicative markers associated with the retrieved data and the indicative markers associated with the additional information retrieved from the server computing device 108. In this embodiment, the program 104 generates a data model by identifying the incorrect information within the retrieved data, retrieving a plurality of corrections for the identified incorrect information from the additional data, and updating the incorrect information with the corrections. In this embodiment, the program 104 defines the generated data model as a corrected retrieved data that has yet to be validated. In this embodiment, the program 104 defines the output of the generated selected model as a corrected version of the retrieved data using the additional information. For example, the program 104 identifies each correction with a citation associated with the additional information.

In this embodiment, the program 104 dynamically selects the at least one data set within the retrieved data by determining a range of accuracy associated with each data set within a plurality of data sets associated with the retrieved data, assigning an accuracy value associated with each set of digital data within a plurality of digital data sets based on a calculated positive match percentage, and ranking the plurality of digital data sets within the relative data based on the assigned accuracy values. In this embodiment, the program 104 defines the range of accuracy as a scale with a maximum of five and a minimum of one that is inversely proportional with a determined risk of correctness associated with the retrieved data. For example, the program 104 determines that the positive match percentage of data comparison A is 100% and positive match percentage of data comparison B is 25%. Also in this example, data comparison A has an accuracy value of one on the determined risk scale, and data comparison B has an accuracy value of four on the determined risk scale. In this embodiment, the program 104 assigns the accuracy value by calculating the positive match percentage between each data set within the retrieved data and the additional information retrieved from the external digital data sources. In this embodiment, the program 104 calculates the positive match percentage by identifying a plurality of factors shared between the retrieved data and the additional information, determining a positive match associated with each factor in the plurality of factors between the retrieved data and the additional information, and calculating the positive match percentage by summing the determined positive matches between the retrieved data and the additional information. In this embodiment, the program 104 assigns the accuracy value based on the calculated positive match percentage for each data set within the retrieved data.

In another embodiment, the program 104 trains a machine learning model associated with the analyzed data based on the generated recommendations associated with the verification of the selected data and the plurality of indicative markers shared between the selected data and the retrieved additional information. In this embodiment, the program 104 trains the machine learning model by storing all of the data and additional information in an external database (i.e., the server computing device 108). For example, the program 104 defines that the output of the trained machine learning model is retrieved digital data that is corrected with updated data retrieved from the additional information, which ensures the user that the data being used is correct and up to date. In this embodiment, the program 104 applies a plurality of parameters as test scenarios to the machine learning model based on the stored data and additional information within the server computing device 108. In this embodiment, the program 104 defines the parameters as the domain, topic, author, author's credibility score, author's area of specialization, and past acceptance information for dynamically selecting the at least one data set from external sources. In this embodiment, the program 104 defines the machine learning model as a generated data model based on previously stored validated digital data.

In another embodiment, the program 104 trains the machine learning model using the stored selected data, generated recommendations, and retrieved additional data to predict a plurality of preferences for a user at a subsequent period of time. In another embodiment, the program 104 generates a plurality of machine learning models associated with the converted data based on the analysis of each indicative markers within the plurality of indicative markers. In this embodiment and in response to generating a plurality of machine learning models, the program 104 dynamically selects at least one generated machine learning model based on the analysis of the plurality of indicative markers associated with each generated machine learning model. In this embodiment, the program 104 dynamically selects the generated machine learning model with the highest positive match percentage between the indicative markers associated with the retrieved data and the indicative markers associated with the additional data retrieved from the server computing device 108.

In step 212, the program 104 automatically validates the selected data sets within the retrieved data. In this embodiment, the program 104 automatically validates the assigned accuracy value associated with the selected data sets within the retrieved data. In this embodiment and in response to the selected data set meets or exceeds the predetermined threshold of accuracy, the program 104 automatically validates the selected data set by determining when the selected data set within the retrieved data was last updated; comparing the selected data set to previous digital data sets and the additional information retrieved from the external data sources; and dynamically updating the selected data set with correct information in response to determining that the selected data set contains outdated or incorrect information. This step will be further discussed in FIG. 3. In this embodiment, the program 104 identifies the predetermined threshold of accuracy by locating the threshold on the scale associated with the assigned accuracy value. In this embodiment, the program 104 determines whether the accuracy value associated with each selected data set meets or exceeds the predetermined threshold of accuracy by comparing the two accuracy values. In this embodiment, the program 104 determines the time of the last update associated with the selected data set by identifying the indicative markers associated with date of creation and date of edit using the machine learning algorithm. In this embodiment, the program 104 compares the selected data set to a previous version of the data set and the additional information associated with the retrieved data by examining each factor in the plurality of factors shared between the selected data set and the additional information. In this embodiment, the program 104 examines each factor by analyzing the selected data set and comparing each factor associated with the selected data and the additional information. In this embodiment, the additional information is data from an external source that is correct, wherein the additional information is validated and retrieved from originating external sources to ensure that the information is correct and up to date. The program 104 determines the correctness of the selected data by examining the plurality of factors shared between the selected data and the additional data. In this embodiment and in response to the selected data set containing incorrect information, the program 104 dynamically updates the selected data set with the correct information retrieved from the external data sources. In another embodiment, the external data sources may be the server computing device 108.

In step 214, the program 104 generates a notification detailing the verification of the selected data set. In this embodiment and in response to the verified accuracy value associated with the selected data set meeting or exceeding the predetermined threshold of accuracy, the program 104 generates a notification to the user detailing the accuracy value of the selected data and the plurality of indicative markers that impacted the accuracy value to meet or exceed the predetermined threshold of accuracy. In this embodiment, the program 104 defines the notification as a recommendation using a recommender algorithm engine. In this embodiment, the program 104 transmits the generated notification to the user for a response. In another embodiment, the program 104 dynamically learns by storing a plurality of received recommendation responses in a server computing device 108 and condensing the plurality of responses into a single database using machine learning algorithm. For example, the program 104 generates the notification detailing that the image data selected, and text data selected are verified, and the audio data was updated due to the date of the last update being two years prior to the data being selected and the size of the audio data failing to meet the description of the audio data. In another example, the program 104 recommends to not include the outdated audio data within the generated notification.

Figure 3:
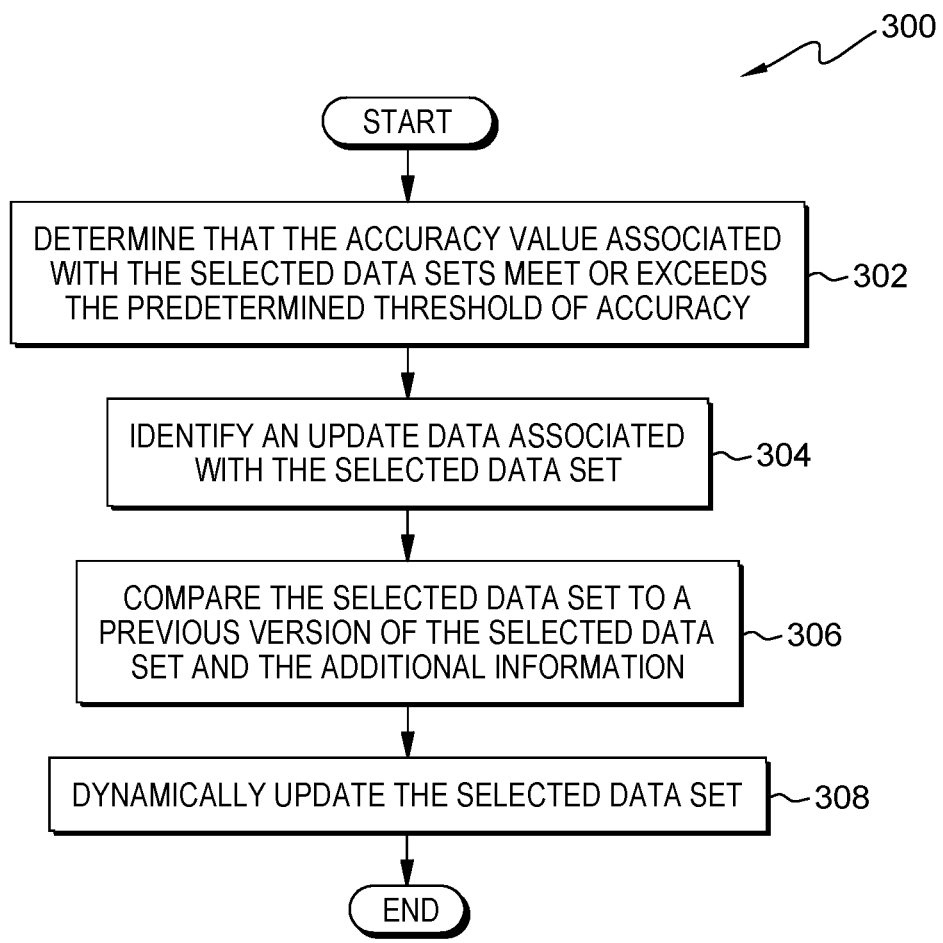
FIG. 3 is a flowchart illustrating operational steps for validating the dynamic selection of the external digital data, in accordance with at least one embodiment of the present invention.

FIG. 3 is a flowchart 300 illustrating operational steps for automatically validating the selected data sets within the retrieved data.

In step 302, the program 104 determines that the accuracy value associated with the selected data sets meets or exceeds the predetermined threshold of accuracy. In this embodiment, the program 104 determines whether the accuracy value associated with the selected data set meets or exceeds the predetermined threshold of accuracy by comparing the accuracy value to the predetermined threshold value. In this embodiment and in response to the accuracy value failing to meet the predetermined threshold of accuracy, the program 104 generates a notification detailing that the selected data is accurate and does not need any additional verification. In this embodiment, the program 104 sets the predetermined threshold of accuracy as a value on the scaled range. For example, the program 104 sets the predetermined threshold of accuracy as a value of four on the ranged scaled of one to five.

In step 304, the program 104 identifies an update date associated with the selected data set. In this embodiment, the program 104 identifies the most recent update data associated with the selected data set by analyzing the plurality of indicative markers associated with the selected data set using the machine learning algorithm, where at least one indicative marker is the most recent update date.

In step 306, the program 104 compares the selected data sets to a previous version of the selected data sets and the additional information. In this embodiment, the program 104 compares the selected data sets to the previous versions of the selected data sets and the additional information retrieved from the external data sources by comparing the plurality of indicative markers associated with the additional information and the selected data sets, wherein the indicative markers contain factors that impact the accuracy value of the selected data sets.

In step 308, the program 104 dynamically updates the selected data sets. In this embodiment, the program 104 dynamically updates the selected data sets in response to the accuracy value associated with the selected data meeting or exceeding the predetermined threshold of accuracy by incorporating the additional information from the external data sources using the machine learning algorithm. In this embodiment, the program 104 dynamically updates the selected data without the need of user input and dynamically generates a notification (i.e., user recommendation) that allows for subsequent training of the selected data set. In this embodiment and in response to any incorrect data being included with the selected data sets that causes the accuracy value of the selected data set to meet or exceed the predetermined threshold of accuracy, the program 104 dynamically updates the selected data sets with the correct information from the external data sources and generates a notification detailing the corrected changes to the selected data sets.

Figure 4:
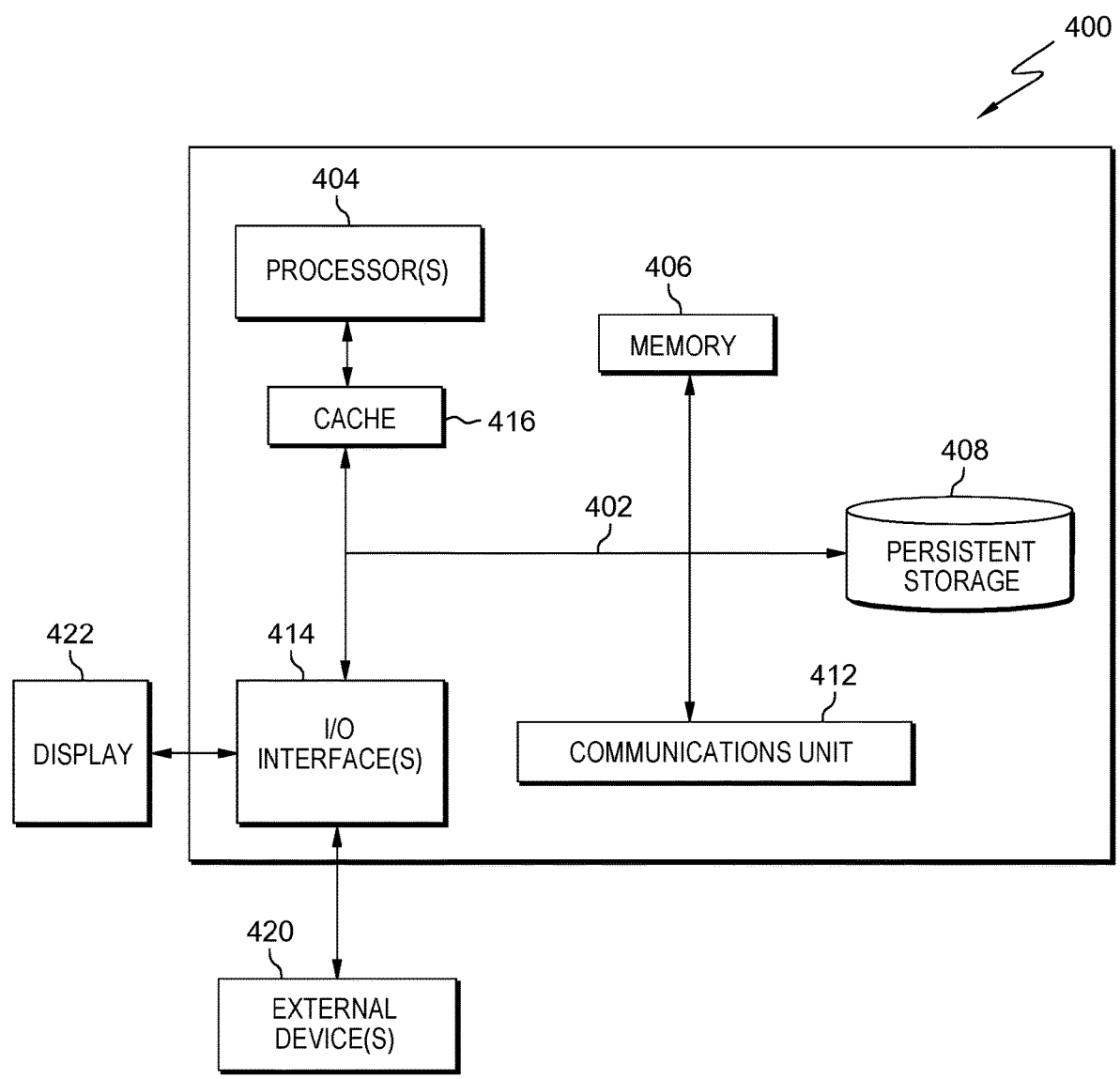
FIG. 4 depicts a block diagram of components of computing systems within a computing display environment of FIG. 1, in accordance with an embodiment of the present invention.

FIG. 4 depicts a block diagram of components of computing systems within a computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 400 includes a communications fabric 402, which provides communications between a cache 416, a memory 406, a persistent storage 408, a communications unit 412, and an input/output (I/O) interface(s) 414. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses or a crossbar switch.

The memory 406 and the persistent storage 408 are computer readable storage media. In this embodiment, the memory 406 includes random access memory (RAM). In general, the memory 406 can include any suitable volatile or non-volatile computer readable storage media. The cache 416 is a fast memory that enhances the performance of the computer processor(s) 404 by holding recently accessed data, and data near accessed data, from the memory 406.

The program 104 may be stored in the persistent storage 408 and in the memory 406 for execution by one or more of the respective computer processors 404 via the cache 416. In an embodiment, the persistent storage 408 includes a magnetic hard disk drive. Alternatively, or in addition to a magnetic hard disk drive, the persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 408 may also be removable. For example, a removable hard drive may be used for the persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 includes one or more network interface cards. The communications unit 412 may provide communications through the use of either or both physical and wireless communications links. The program 104 may be downloaded to the persistent storage 408 through the communications unit 412.

The I/O interface(s) 414 allows for input and output of data with other devices that may be connected to a mobile device, an approval device, and/or the server computing device 108. For example, the I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 408 via the I/O interface(s) 414. The I/O interface(s) 414 also connect to a display 422.

The display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method comprising:
   identifying data retrieved from a server computing device and scanning an external data score for additional information associated with retrieved data;
   defining additional information, associated with the retrieved data, wherein the additional information comprises: an origin, authenticity, and an update associated with the retrieved data;
   defining a plurality of parameters for dynamically selecting the data from the server computing device, wherein the plurality of parameters comprise: domain, topic, an author, credibility score of the author, area of specialization of the author, and past acceptance information;
   converting the retrieved data to a uniform syntax for data assessment by transforming the data to a common dominator using a data translation algorithm, wherein the uniform syntax is able to facilitate uniform comparison, aggregation, and separation of data sets within the retrieved data, and wherein the uniform syntax is an arrangement of words, numbers, symbols, or code to create a formed sentence in a language;
   performing a query on a plurality of external data sources for additional information associated with the converted data;
   analyzing a plurality of indicative markers associated with the retrieved data and the additional information;
   generating a plurality of machine learning models associated with the converted data based on the analysis of each indicative markers within the plurality of indicative markers;
   dynamically selecting at least one generated machine learning model within a plurality of generated machine learning models associated with the retrieved data based on an analysis of the plurality of indicative markers associated with the retrieved data and the additional information;
   automatically verifying an accuracy value associated with the at least one selected generated machine learning model, wherein the accuracy value is calculated value of correctness associated with the selected generated machine learning model; and
   generating a user recommendation for the server computing device associated with the selected machine learning model, wherein the user recommendation is a plurality of ameliorative actions.

2. The computer-implemented method of claim 1, wherein periodically retrieving data comprises:
   identifying digital data stored on the external data sources using a plurality of sensor devices and an artificial intelligence algorithm; and
   retrieving the identified digital data from the external data sources.

3. The computer-implemented method of claim 1, wherein converting the retrieved data comprises encoding the retrieved data from one syntax domain to a different syntax domain.

4. The computer-implemented method of claim 1, wherein analyzing the plurality of indicative markers associated with the retrieved data and the additional information comprises determining a positive match percentage based on a calculated comparison between at least one data set within the retrieved data and the additional information.

5. The computer-implemented method of claim 1, wherein dynamically selecting the at least one generated machine learning model comprises:
   determining a range of accuracy associated with each machine learning model within a plurality of machine learning models associated with the retrieved data;
   assigning an accuracy value for each indicative marker associated with each machine learning model based on a calculated positive match percentage; and
   ranking the plurality of machine learning models associated the retrieved data based on the assigned accuracy values.

6. The computer-implemented method of claim 1, wherein automatically verifying an accuracy value associated with the selected generated machine learning model comprises:
   determining when the selected machine learning model associated with the retrieved data was last updated;
   comparing the selected machine learning module to previous machine learning model and the additional information retrieved from the external data sources; and
   dynamically updating the selected machine learning model with correct information in response to determining that the selected machine learning model contains outdated or incorrect information.

7. The computer-implemented method of claim 6, wherein dynamically updating the selected machine learning model comprises incorporating the additional information from the external data sources into the selected machine learning model using a machine learning algorithm.

8. A computer program product comprising:
   one or more computer readable storage media and program instructions stored on the one or more computer readable storage media, the program instructions comprising:
   program instructions to identify data retrieved from a server computing device and scanning an external data score for additional information associated with retrieved data;
   program instructions to identify define additional information, associated with the retrieved data, wherein the additional information comprises: an origin, authenticity, and an update associated with the retrieved data;

program instructions to define a plurality of parameters for dynamically selecting the data from the server computing device, wherein the plurality of parameters comprise: domain, topic, an author, credibility score of the author, area of specialization of the author, and past acceptance information;

program instructions to convert the retrieved data to a uniform syntax for data assessment by transforming the data to a common dominator using a data translation algorithm, wherein the uniform syntax is able to facilitate uniform comparison, aggregation, and separation of data sets within the retrieved data, and wherein the uniform syntax is an arrangement of words, numbers, symbols, or code to create a formed sentence in a language;

program instructions to perform a query on a plurality of external data sources for additional information associated with the converted data;

program instructions to analyze a plurality of indicative markers associated with the retrieved data and the additional information;

program instructions to generate a plurality of machine learning models associated with the converted data based on an analysis of each indicative markers within the plurality of indicative markers;

program instructions to dynamically select at least one generated machine learning model within the plurality of generated machine learning models associated with the retrieved data based on the analysis of the plurality of indicative markers associated with the retrieved data and the additional information;

program instructions to automatically verify an accuracy value associated with the at least one selected generated machine learning model, wherein the accuracy value is calculated value of correctness associated with the selected generated machine learning model; and program instructions to generate a user recommendation for the server computing device associated with the selected machine learning model, wherein the user recommendation is a plurality of ameliorative actions.

9. The computer program product of claim 8, wherein the program instructions to periodically retrieve data comprise:
program instructions to identify digital data stored on the external data sources using a plurality of sensor devices and an artificial intelligence algorithm; and
program instructions to retrieve the identified digital data from the external data sources.

10. The computer program product of claim 8, wherein the program instructions to convert the retrieved data comprise program instructions to encode the retrieved data from one syntax domain to a different syntax domain.

11. The computer program product of claim 8, wherein the program instructions to analyze the plurality of indicative markers associated with the retrieved data and the additional information comprise program instructions to determine a positive match percentage based on a calculated comparison between at least one data set within the retrieved data and the additional information.

12. The computer program product of claim 8, wherein the program instructions to dynamically select the at least one generated machine learning model comprise:
program instructions to determine a range of accuracy associated with each machine learning model within a plurality of machine learning models associated with the retrieved data;

program instructions to assign an accuracy value for each indicative marker associated with each machine learning model based on a calculated positive match percentage; and
program instructions to rank the plurality of machine learning models associated the retrieved data based on the assigned accuracy values.

13. The computer program product of claim 8, wherein the program instructions to automatically verify an accuracy value associated with the selected generated machine learning model comprise:
program instructions to determine when the selected machine learning model associated with the retrieved data was last updated;
program instructions to compare the selected machine learning model to previous machine learning models and the additional information retrieved from the external data sources; and
program instructions to dynamically update the selected machine learning model with correct information in response to determining that the selected machine learning model contains outdated or incorrect information.

14. The computer program product of claim 8, wherein the program instructions to dynamically update the selected machine learning model comprise program instructions to incorporate the additional information from the external data sources into the selected machine learning model using a machine learning algorithm.

15. A computer system comprising:
one or more computer processors;
one or more computer readable storage media; and
program instructions stored on the one or more computer readable storage media for execution by at least one of the one or more processors, the program instructions comprising:
program instructions to identify data retrieved from a server computing device and scanning an external data score for additional information associated with retrieved data;
program instructions to identify define additional information, associated with the retrieved data, wherein the additional information comprises: an origin, authenticity, and an update associated with the retrieved data;
program instructions to define a plurality of parameters for dynamically selecting the data from the server computing device, wherein the plurality of parameters comprise: domain, topic, an author, credibility score of the author, area of specialization of the author, and past acceptance information;
program instructions to convert the retrieved data to a uniform syntax for data assessment by transforming the data to a common dominator using a data translation algorithm, wherein the uniform syntax is able to facilitate uniform comparison, aggregation, and separation of data sets within the retrieved data, and wherein the uniform syntax is an arrangement of words, numbers, symbols, or code to create a formed sentence in a language;
program instructions to perform a query on a plurality of external data sources for additional information associated with the converted data;
program instructions to analyze a plurality of indicative markers associated with the retrieved data and the additional information;

program instructions to generate a plurality of machine learning models associated with the converted data based on an analysis of each indicative markers within the plurality of indicative markers;

program instructions to dynamically select at least one generated machine learning model within the plurality of generated machine learning models associated with the retrieved data based on the analysis of the plurality of indicative markers associated with the retrieved data and the additional information;

program instructions to automatically verify an accuracy value associated with the at least one selected generated machine learning model, wherein the accuracy value is calculated value of correctness associated with the selected generated machine learning model; and program instructions to generate a user recommendation for the server computing device associated with the selected machine learning model, wherein the user recommendation is a plurality of ameliorative actions.

16. The computer system of claim 15, wherein the program instructions to periodically retrieve data comprise:
program instructions to identify digital data stored on the external data sources using a plurality of sensor devices and an artificial intelligence algorithm; and
program instructions to retrieve the identified digital data from the external data sources.

17. The computer system of claim 15, wherein the program instructions to convert the retrieved data comprise program instructions to encode the retrieved data from one syntax domain to a different syntax domain.

18. The computer system of claim 15, wherein the program instructions to analyze the plurality of indicative markers associated with the retrieved data and the additional information comprise program instructions to determine a positive match percentage based on a calculated comparison between at least one data set within the retrieved data and the additional information.

19. The computer system of claim 15, wherein the program instructions to dynamically select the at least one generated machine learning model comprise:
program instructions to determine a range of accuracy associated with each machine learning model within a plurality of machine learning models associated with the retrieved data;
program instructions to assign an accuracy value for each indicative marker associated with each machine learning model based on a calculated positive match percentage; and
program instructions to rank the plurality of machine learning models associated the retrieved data based on the assigned accuracy values.

20. The computer system of claim 15, wherein the program instructions to automatically verify an accuracy value associated with the selected generated machine learning model comprise:
program instructions to determine when the selected machine learning model associated with the retrieved data was last updated;
program instructions to compare the selected machine learning model to previous machine learning model and the additional information retrieved from the external data sources; and
program instructions to dynamically update the selected machine learning model with correct information in response to determining that the selected machine learning model contains outdated or incorrect information.

* * * * *